United States Patent [19]

Fast et al.

[11] 4,130,165

[45] Dec. 19, 1978

[54] METHOD FOR SELECTIVELY PLUGGING WATER ZONES

[75] Inventors: Clarence R. Fast; George E. King, both of Tulsa, Okla.

[73] Assignee: Standard Oil Company (Indiana), Chicago, Ill.

[21] Appl. No.: 901,906

[22] Filed: May 1, 1978

Related U.S. Application Data

[63] Continuation of Ser. No. 760,195, Jan. 17, 1977, abandoned.

[51] Int. Cl.² .................. E21B 33/138; E21B 43/00
[52] U.S. Cl. .................. 166/279; 166/294; 166/305 R
[58] Field of Search .............. 166/279, 285, 292, 294, 166/305 R

[56] References Cited

U.S. PATENT DOCUMENTS

| | | | |
|---|---|---|---|
| 2,053,285 | 9/1936 | Grebe | 166/305 R |
| 2,164,459 | 7/1939 | Kennedy | 166/292 |
| 2,377,529 | 6/1945 | Stephenson | 166/305 R |
| 2,387,361 | 10/1945 | Stephenson | 166/305 R |
| 2,976,926 | 3/1961 | Maly | 166/305 R |
| 3,004,599 | 10/1961 | Goodwin et al. | 166/305 R X |
| 3,093,192 | 6/1963 | Allen | 166/294 |
| 3,330,351 | 7/1967 | Bernard | 166/294 X |
| 3,394,758 | 7/1968 | Terry et al. | 166/292 |
| 3,472,319 | 10/1969 | McAuliffe | 166/294 X |
| 3,547,199 | 12/1970 | Froning et al. | 166/305 R |

*Primary Examiner*—Stephen J. Novosad
*Assistant Examiner*—George A. Suchfield
*Attorney, Agent, or Firm*—Albert C. Metrailer

[57] ABSTRACT

A method for shutting off or decreasing the production of water from an oil well. An oil well producing excess water is taken off production and a gas is injected into the well, followed by a slug of clean oil containing an emulsifier. The well is then produced as fast as possible. The previously injected gas and water in water-producing zones begin to finger back through the oil slug and forms a viscous emulsion which blocks the further flow of water into the producing well.

6 Claims, No Drawings

METHOD FOR SELECTIVELY PLUGGING WATER ZONES

This is a continuation, of application Ser. No. 760,195, filed Jan. 17, 1977, now abandoned.

BACKGROUND OF THE INVENTION

This invention relates to a method of oil production and more particularly to a method for reducing the production of water from an oil-producing well.

Production of water along with crude oil is a problem that generally is tolerated so long as lifting and separating costs do not become uneconomical. In addition to increasing the expense of obtaining oil, the production of water also poses problems in its disposal. When water enters a borehole at a level different from that at which the oil enters, the water flow can be controlled by squeeze cementing or casing the producing formation and perforating through only to the oil production zone. In many cases though, the exact water entry point can not be determined or the water is commingled with the oil at the entry point to the borehole. A wide variety of methods for plugging off the water-producing portions of the formation, while not affecting the oilproducing formations, have been proposed and attempted with varying degrees of success.

One such method is described in U.S. Pat. No. 3,547,199 issued to H R. Froning, et al., on Dec. 15, 1970. This method generally involves the use of a foam to form a water block. The advantage of this method over other foam methods is that the foaming agent is oil-sensitive and therefore produces foam only in the water-bearing portions of the formation so that flow of oil is not obstructed. This selective characteristic of a water-blocking material has been the most difficult to obtain in practice.

Another material which is known to be useful for plugging subsurface formations is water-oil emulsion. An example of a plugging method intended to improve the injection profile of an injection well is found in U.S. Pat. No. 3,472,319 issued to McAuliffe on Oct. 14, 1969. In this patent, a mixture of oil, water, and an emulsifying agent is pumped into an injection well for the purpose of reducing flow of injected water through more permeable zones. Part of the selective nature of this disclosure is achieved by designing an emulsion which increases in viscosity with time.

Attempts have been made to use emulsions for the purpose of reducing the flow of water into oil-producing wells. One known method of causing the plugging effect to be selective is to inject only oil with an emulsifying agent in it into the formation. An emulsion then forms in-place in the formation wherever the oil with the emulsifier contacts water. While this in-place formation of emulsion in water-bearing zones has worked in some cases, it has not proved reliable enough to use on a regular basis. The ineffectiveness of this method is generally believed to be due to the difficulty of obtaining adequate mixing between the formation water and the injected oil-emulsifier mixture.

SUMMARY OF THE INVENTION

Accordingly, an object of the invention is to provide an improved method for blocking the production of water into an oil production well.

Another object of the present invention is to provide a reliable method for forming an emulsion in-place in a subsurface formation.

According to the present invention, water flow from an oil-producing well is reduced by injecting in sequence a gas followed by a slug of oil containing an emulsifier into an oil production well and then returning the well to a producing condition. The injected gas provides the energy to efficiently mix formation water with injected oil-emulsifier mixture to form a thick layer of a stable emulsion in those areas from which water is produced and thereby block the flow of water to the production well.

DESCRIPTION OF THE PREFERRED EMBODIMENT

In the practice of the present invention a proper selection of oil must be made to form the optimum emulsion. In all cases it is preferred that the oil be clean in the sense that it contains essentially no solid particles of such type and size as would clog the formation when the oil is injected into the production well. Such an oil can be injected more deeply into the formation without damaging the formation. The deep displacement of oil into the formation is preferred, since this allows the formation of a thicker emulsion layer and allows the emulsion layer to be a sufficient distance from the wellbore that injectivity is not diminished by the emulsion. In quite a few cases the available crude oil produced from the well is clean enough to be reinjected as the emulsifying oil according to the present invention without any damaging effects to the formation. Crude oil may be filtered to remove solids, if necessary. If no other clean oil is available, then a refined viscous oil is preferred for the above reasons.

An effective emulsion block depends upon the emulsion having a very low mobility in the formation relative to the crude oil being produced. Emulsion mobility is proportional to the emulsion viscosity which is proportional to the viscosity of the oil used in making the emulsion. A proper oil viscosity must therefore be chosen according to the formation permeability. Formation permeability is generally known from cores taken in drilling the well or from various logs run after the well has been drilled. In general, the higher the formation permeability, the higher is the required oil viscosity. Table 1 lists oil viscosities and corresponding emulsion viscosities recommended for various ranges of formation permeability.

TABLE 1

| PERMEABILITY (md) | OIL VISCOSITY (cp) | EMULSION VISCOSITY AT SHEAR STRESS OF 511 sec$^{-1}$ (cp) |
|---|---|---|
| 25 – 50 | 50 | 250 |
| 50 – 100 | 100 | 400 |
| 100 – 250 | 250 | 900 |
| 250 – 500 | 425 | 1500 |
| 500 – 1000 | 900 | 2500 |
| >1000 | heaviest oil available | |

In many cases the available lease crude will fall within the suggested viscosity ranges according to Table 1 and will also be clean enough, as mentioned above. Where it is suitable, the use of lease crude is preferred, due to its low cost and availability. If lease crude is too thin, various oil thickeners may be added to increase viscosity. As a last choice, due to cost, a viscous, refined oil may be used.

The actual first step of the present invention is the injection of a suitable gas into the production well. The requirements for such a gas are essentially the same as those in U.S. Pat. No. 3,547,199. The gas should be essentially inert as far as reactions with the formation and the fluids contained therein are concerned. In laboratory testing, both air and nitrogen were successfully used. To reduce cost in field operations, flue gas or natural gas, which may be available at high pressure, may also be used. Sufficient gas should be injected into the well to insure that when the well is placed back on production, pressurized gas in the formation will be present to provide energy to push fluids and the gas back toward the production well and enhance emulsification. When injected, the gas will move some formation fluids, mostly mobile water, away from the borehole, but due to its high mobility the gas will tend to bypass most of the formation fluids.

Following the injection of gas, a slug of suitable viscous oil containing a small amount of emulsifier, typically 0.25 to 0.50 percent, is injected into the formation. The quantity of oil injected depends upon both the formation permeability and the producing pressure of the formation. In laboratory experiments, sections of Berea sandstone of 100 md permeability had a 90 to 97 percent reduction in permeability to waterflow, with pressure differentials of 300 psi/linear foot. As a result, it is preferred that for formations of under 500 md permeability, that a volume should be used which is sufficient to reach $\frac{1}{8}$ to $\frac{1}{4}$ foot into the rock for each 100 psi of producing pressure. Generally speaking, the further the oil can be injected into the formation, the longer the treatment will last and the more successful it will be. Some of the injected oil will be produced when the well is placed back on production and this loss must also be accounted for. The loss of emulsifying oil can be avoided by following it with a volume of oil containing no emulsifier so that the trailing edge of the emulsifying oil slug is displaced from the borehole before the well is placed back on production.

Although during the emulsifying oil injection step the oil will contact water in the formation, very little emulsification will occur at that time. Since the oil is much more viscous than water, the oil will remain in a fairly well defined slug and will displace all of the lower viscosity water from its path. Thus, the emulsifying oil and water will make contact only at a small area interface and little or no agitation of the two fluids will occur.

When sufficient emulsifying oil has been injected into the formation, the well is placed back on production. Preferably this production status occurs immediately at the end of oil injection and at the highest rate possible. This production step causes the highly mobile gas which was previously injected into the formation to move toward the production well. The mobility ratios between the gas and water in the formation and the water and the viscous emulsifying oil are such that the water tends to finger through or bypass the oil bank and the gas tends to finger through or bypass both the water and the oil. The result of this gas and water movement is a high rate of agitation or mixing of the water and emulsifying oil. The mixing causes a thick bank of water-oil emulsion to form in those areas of the formation where water is present. Where the gas and emulsifying oil have flowed into oil-containing portions of the formation, the gas will be produced and will bypass the emulsifying oil; but since no water is present, no emulsion will be formed. The formation crude will then move the emulsifying oil back to the borehole, where it will be produced with the crude. The final result is an effective water-blocking emulsion in the water-producing portions of the formation, with essentially no effect on oil-producing portions.

In some areas the connate water present in the oil-producing portions of the formation may be sufficient to cause generation of enough emulsion to reduce the flow of oil in the oil-producing areas. In such a case, a water-removing fluid may be injected either before or after the gas injection step to remove this connate water from an area around the wellbore. Such a slug of water-removing material will dissipate rapidly in the water-producing portions of the formation and have little effect on the water-producing formations. In the oil-producing portions, the water-removing material will effectively remove connate water at a much greater distance from the borehole and thereby prevent emulsification in these oil-producing areas. An example of a method of removing water from oil-producing formations is found in U.S. Pat. No. 3,783,945 issued to Dauben, et al., on Jan. 8, 1974.

EXAMPLE

Several laboratory tests of the present invention were performed using cores of Berea sandstone having a gas permeability of 70 md. In a first test a core was flooded with 5 percent KCl in distilled water and flowed to a stable permeability of 35 md. An emulsifying oil was prepared from 10 weight, nondetergent motor oil having 60 cp viscosity, mixed with $\frac{1}{4}$ percent of a polybutene, polymeric sodium sulfonate emulsifier, sold commercially by Amoco Chemicals Company under the name "Amoco Sulfonate 151." This material is the surfactant described in U.S. Pat. No. 3,714,062. The sample used in this test was 49.7 percent active. Water flow in the core was stopped and the emulsifying oil mixture was injected in the opposite flow direction in stages separated by slugs of nitrogen gas. The use of a series of gas-oil injections was intended to increase the amount of gas dissolved in the oil to enhance emulsification and better simulate formation conditions. The solution of 5 percent KCl in distilled water was then resumed and a permeability of 0.5 md was measured. The permeability increased slowly to a value of approximately 1 md after 27 hours. City water containing approximately 50 ppm sodium ion was then routed into the core and permeability fell essentially to zero. A second injection of 5 percent KCl in distilled water produced some permeability through the core, which was then reduced to zero again by the injection of the city water. Thus, sodium ions, which are normally present in formation water, appear to greatly improve the emulsifying properties of the emulsifier used in these tests.

A second core of Berea sandstone was tested to determine what effect the emulsifying oil would have on oil-producing formations. This core was first flooded with an oil and then injected with the oil-emulsifier mixture used in the first test. The permeability to oil was reduced by 80 percent when the core was placed back onto oil production, but after several hours the produced oil displaced the oil-emulsifier mixture and the core returned to its original permeability value.

A third Berea sandstone core was flooded with water as in the first test and then injected with the 10 weight nondetergent motor oil, but with no emulsifier. A temporary reduction in permeability was observed while the produced water displaced the injected oil from the core.

Emulsification tests with the oil-emulsifier mixture and the two waters used in the test were performed. Distilled water containing 5 percent KCl did not form a stable emulsion while the city water did.

While the present invention has been shown in terms of a specific method, it is apparent that changes and modifications can be made within the spirit of the present invention as defined by the appended claims.

We claim:

1. A method for reducing the production of water from an oil production well which penetrates an oil producing formation comprising in the following order the steps of:
   (a) injecting gas into said oil producing formation by means of said production well;
   (b) injecting a mixture of clean oil and emulsifier into said oil producing formation by means of said production well; and
   (c) producing fluids from said oil producing formation by means of said production well.

2. The method according to claim 1 further including the step of injecting a slug of water-displacing material into said formation by means of said production well prior to injection of said gas.

3. A method according to claim 1 wherein said clean oil has a viscosity greater than the viscosity of the formation oil.

4. A method according to claim 1 wherein said clean oil includes an oil thickener to increase the viscosity of said clean oil to at least the viscosity of the formation oil.

5. A method according to claim 1 further including the steps of repeating steps (a) and (b) at least one time before producing fluids from said formation by means of the well.

6. A process according to claim 1 wherein the gas is natural gas.

* * * * *